US012743337B2

(12) United States Patent
Dodds et al.

(10) Patent No.: US 12,743,337 B2
(45) Date of Patent: Sep. 22, 2026

(54) SIMPLIFIED EFFICIENT ERROR CORRECTION CODE SCHEMES USING MULTIPLE CODEWORDS

(71) Applicant: Microsoft Technology Licensing, LLC, Redmond, WA (US)

(72) Inventors: Brett Kenneth Dodds, Boise, ID (US); Terry M. Grunzke, Boise, ID (US); Majid Anaraki Nemati, San Diego, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/934,144

(22) Filed: Oct. 31, 2024

(65) Prior Publication Data

US 2026/0119312 A1 Apr. 30, 2026

(51) Int. Cl.
*G06F 11/00* (2006.01)
*G06F 11/10* (2006.01)

(52) U.S. Cl.
CPC ...... *G06F 11/1004* (2013.01); *G06F 11/1048* (2013.01)

(58) Field of Classification Search
CPC ......................... G06F 11/1004; G06F 11/1048
USPC ........................................................ 714/1–57
See application file for complete search history.

(56) References Cited

U.S. PATENT DOCUMENTS 8,549,382 B2 10/2013 Motwani
11,050,437 B1 6/2021 Patel
12,038,809 B1 7/2024 Zhang
2008/0163033 A1 7/2008 Yim
2008/0168320 A1* 7/2008 Cassuto .............. G06F 11/1068 714/E11.038
2008/0195890 A1* 8/2008 Earhart ................. G06F 3/0644 714/6.23
2013/0080862 A1* 3/2013 Bennett ............... G06F 11/1072 714/752
2013/0227374 A1* 8/2013 Desireddi ........... G06F 11/1012 714/E11.032

(Continued)

OTHER PUBLICATIONS

Notice of Allowance mailed on Oct. 7, 2025, in U.S. Appl. No. 18/595,177, 10 Pages.

(Continued)

*Primary Examiner* — Sarai E Butler
(74) *Attorney, Agent, or Firm* — Alleman Hall LLP

(57) ABSTRACT

Implementations for simplified and efficient error correction code schemes with multiple codewords are provided. One aspect includes a computing system comprising: processing circuitry and memory storing instructions that, during execution, causes the processing circuitry to: encode data comprising user data and metadata in a memory module comprising a plurality of dies by: logically partitioning the memory module into a plurality of partitions; on a first partition: storing a first portion of the user data on one or more memory segments of the first partition; and storing a first cyclic redundancy check (CRC) codeword and the metadata on a memory segment of the first partition different from the one or more memory segments of the first partition, wherein the first CRC codeword is generated based on the first portion of the user data and the metadata; and storing parity data on one of the plurality of dies.

20 Claims, 9 Drawing Sheets

(56) References Cited

U.S. PATENT DOCUMENTS

| | | | | |
|---|---|---|---|---|
| 2019/0294499 | A1 | 9/2019 | Yang | |
| 2020/0097394 | A1* | 3/2020 | Eno | G11C 16/3495 |
| 2021/0055868 | A1* | 2/2021 | Basu | G06F 3/0679 |
| 2021/0103824 | A1* | 4/2021 | Milenkovic | C40B 40/06 |
| 2022/0291838 | A1 | 9/2022 | Gorobets | |
| 2024/0004756 | A1* | 1/2024 | McCrate | G06F 11/0772 |
| 2024/0086277 | A1 | 3/2024 | Tang | |
| 2024/0128985 | A1 | 4/2024 | Jun | |
| 2025/0123922 | A1 | 4/2025 | Asadi | |
| 2025/0278331 | A1 | 9/2025 | Dodds | |
| 2025/0370858 | A1* | 12/2025 | Yogev | G06F 11/1044 |

OTHER PUBLICATIONS

Joong-Ho. Lee, "CRC (Cyclic Redundancy Check) Implementation in High-Speed Semiconductor Memory," 2015 8th International Conference on Control and Automation—IEEE, 2015, pp. 17-20.

Non-Final Office Action mailed on May 20, 2025, in U.S. Appl. No. 18/595,177, 15 pages.

Extended European Search Report Received in European Patent Application No. 25211213.1, mailed on Mar. 5, 2026, 12 pages.

* cited by examiner

Figure 7:
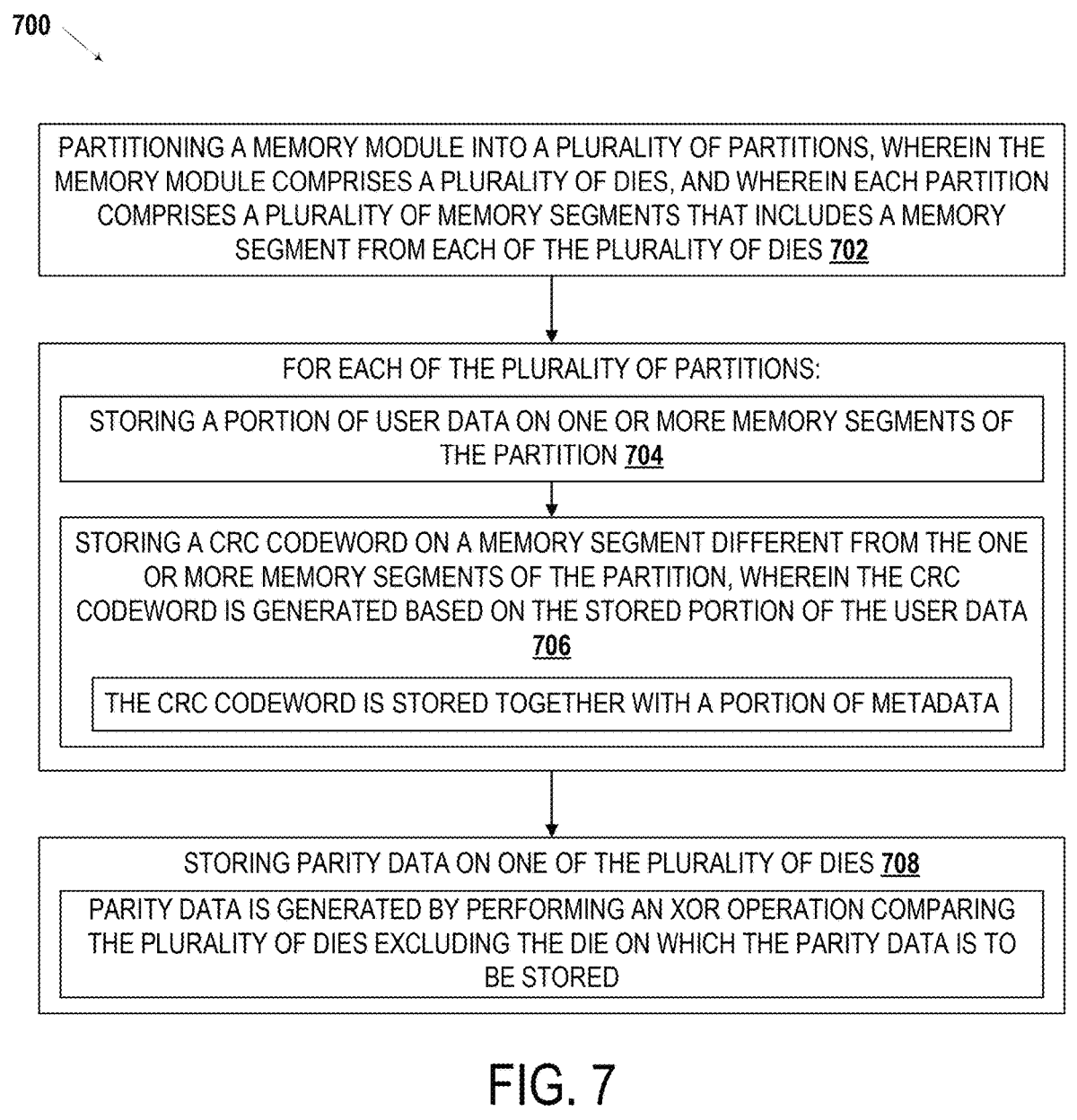

700

PARTITIONING A MEMORY MODULE INTO A PLURALITY OF PARTITIONS, WHEREIN THE MEMORY MODULE COMPRISES A PLURALITY OF DIES, AND WHEREIN EACH PARTITION COMPRISES A PLURALITY OF MEMORY SEGMENTS THAT INCLUDES A MEMORY SEGMENT FROM EACH OF THE PLURALITY OF DIES 702

FOR EACH OF THE PLURALITY OF PARTITIONS:

STORING A PORTION OF USER DATA ON ONE OR MORE MEMORY SEGMENTS OF THE PARTITION 704

STORING A CRC CODEWORD ON A MEMORY SEGMENT DIFFERENT FROM THE ONE OR MORE MEMORY SEGMENTS OF THE PARTITION, WHEREIN THE CRC CODEWORD IS GENERATED BASED ON THE STORED PORTION OF THE USER DATA 706

THE CRC CODEWORD IS STORED TOGETHER WITH A PORTION OF METADATA

STORING PARITY DATA ON ONE OF THE PLURALITY OF DIES 708

PARITY DATA IS GENERATED BY PERFORMING AN XOR OPERATION COMPARING THE PLURALITY OF DIES EXCLUDING THE DIE ON WHICH THE PARITY DATA IS TO BE STORED

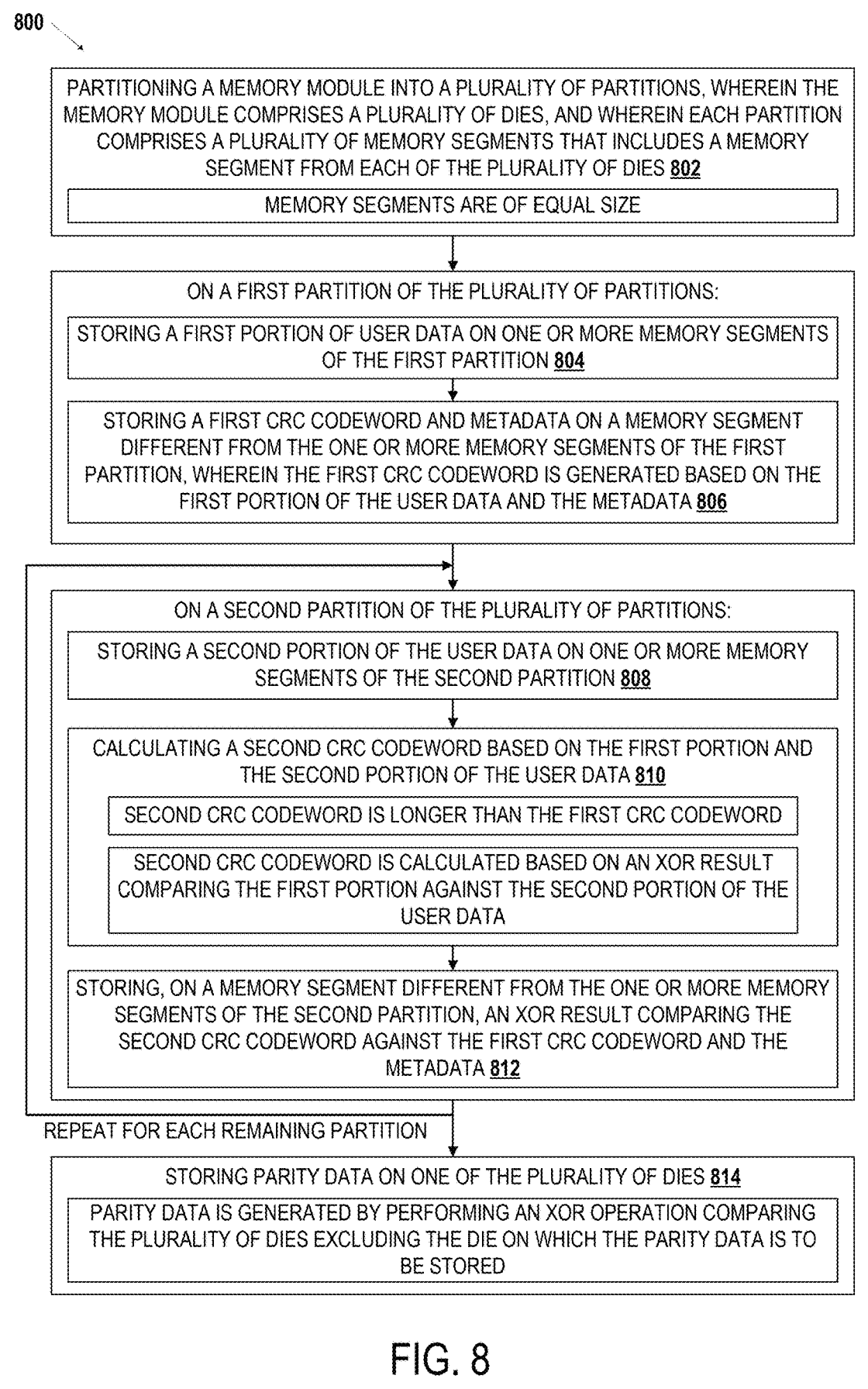

PARTITIONING A MEMORY MODULE INTO A PLURALITY OF PARTITIONS, WHEREIN THE MEMORY MODULE COMPRISES A PLURALITY OF DIES, AND WHEREIN EACH PARTITION COMPRISES A PLURALITY OF MEMORY SEGMENTS THAT INCLUDES A MEMORY SEGMENT FROM EACH OF THE PLURALITY OF DIES 802

MEMORY SEGMENTS ARE OF EQUAL SIZE

ON A FIRST PARTITION OF THE PLURALITY OF PARTITIONS:

STORING A FIRST PORTION OF USER DATA ON ONE OR MORE MEMORY SEGMENTS OF THE FIRST PARTITION 804

STORING A FIRST CRC CODEWORD AND METADATA ON A MEMORY SEGMENT DIFFERENT FROM THE ONE OR MORE MEMORY SEGMENTS OF THE FIRST PARTITION, WHEREIN THE FIRST CRC CODEWORD IS GENERATED BASED ON THE FIRST PORTION OF THE USER DATA AND THE METADATA 806

ON A SECOND PARTITION OF THE PLURALITY OF PARTITIONS:

STORING A SECOND PORTION OF THE USER DATA ON ONE OR MORE MEMORY SEGMENTS OF THE SECOND PARTITION 808

CALCULATING A SECOND CRC CODEWORD BASED ON THE FIRST PORTION AND THE SECOND PORTION OF THE USER DATA 810

SECOND CRC CODEWORD IS LONGER THAN THE FIRST CRC CODEWORD

SECOND CRC CODEWORD IS CALCULATED BASED ON AN XOR RESULT COMPARING THE FIRST PORTION AGAINST THE SECOND PORTION OF THE USER DATA

STORING, ON A MEMORY SEGMENT DIFFERENT FROM THE ONE OR MORE MEMORY SEGMENTS OF THE SECOND PARTITION, AN XOR RESULT COMPARING THE SECOND CRC CODEWORD AGAINST THE FIRST CRC CODEWORD AND THE METADATA 812

REPEAT FOR EACH REMAINING PARTITION

STORING PARITY DATA ON ONE OF THE PLURALITY OF DIES 814

PARITY DATA IS GENERATED BY PERFORMING AN XOR OPERATION COMPARING THE PLURALITY OF DIES EXCLUDING THE DIE ON WHICH THE PARITY DATA IS TO BE STORED

FIG. 8

SIMPLIFIED EFFICIENT ERROR CORRECTION CODE SCHEMES USING MULTIPLE CODEWORDS

BACKGROUND

Error correction code (ECC) schemes refer to coding techniques for detecting and/or fixing errors in data storage and transmission, which can prevent system crashes and/or data loss. Such schemes may be crucial in various applications where data integrity is important, such as data server environments. Generally, data is encoded in a redundant way to provide error detection and/or correction. Depending on the degree of redundancy, the ECC scheme implemented may be able to detect and correct data corruption of varying degrees.

One example of an ECC scheme includes the use of a cyclic redundancy check (CRC). CRC can be implemented by appending a fixed-length check value to a block of data, forming a "codeword" to be stored or transmitted, for example. The check value is a redundancy that utilizes cyclic codes to verify whether the data is corrupted. When the encoded data is read or received, the system may compare the check value to a value freshly calculated from the block of data. Mismatches indicate a data error, and the device may take corrective action, such as direct correction if ECC has such capability or rereading the encoded data or requesting another transmission. Matching values may be assumed to be error-free. However, there are possibilities of undetected errors, which can depend on the CRC scheme implemented and the block of data being encoded.

SUMMARY

Implementations for simplified efficient error correction code schemes with multiple codewords are provided. One aspect includes a computing system comprising: processing circuitry and memory storing instructions that, during execution, causes the processing circuitry to: encode data comprising user data and metadata in a memory module comprising a plurality of dies by: logically partitioning the memory module into a plurality of partitions, wherein each partition comprises a plurality of memory segments that includes a memory segment from each of the plurality of dies; on a first partition of the plurality of partitions: storing a first portion of the user data on one or more memory segments of the first partition; and storing a first cyclic redundancy check (CRC) codeword and the metadata on a memory segment of the first partition different from the one or more memory segments of the first partition, wherein the first CRC codeword is generated based on the first portion of the user data and the metadata; and storing parity data on one of the plurality of dies.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 7 shows a flow diagram of an example method for implementing a simplified and efficient error correction code scheme with multiple codewords, which can be implemented in the example computing system of FIG. 1.

FIG. 8 shows a flow diagram of an example method for implementing a modified asymmetric error correction code scheme with multiple codewords, which can be implemented in the example computing system of FIG. 1.

DETAILED DESCRIPTION

Figure 1:
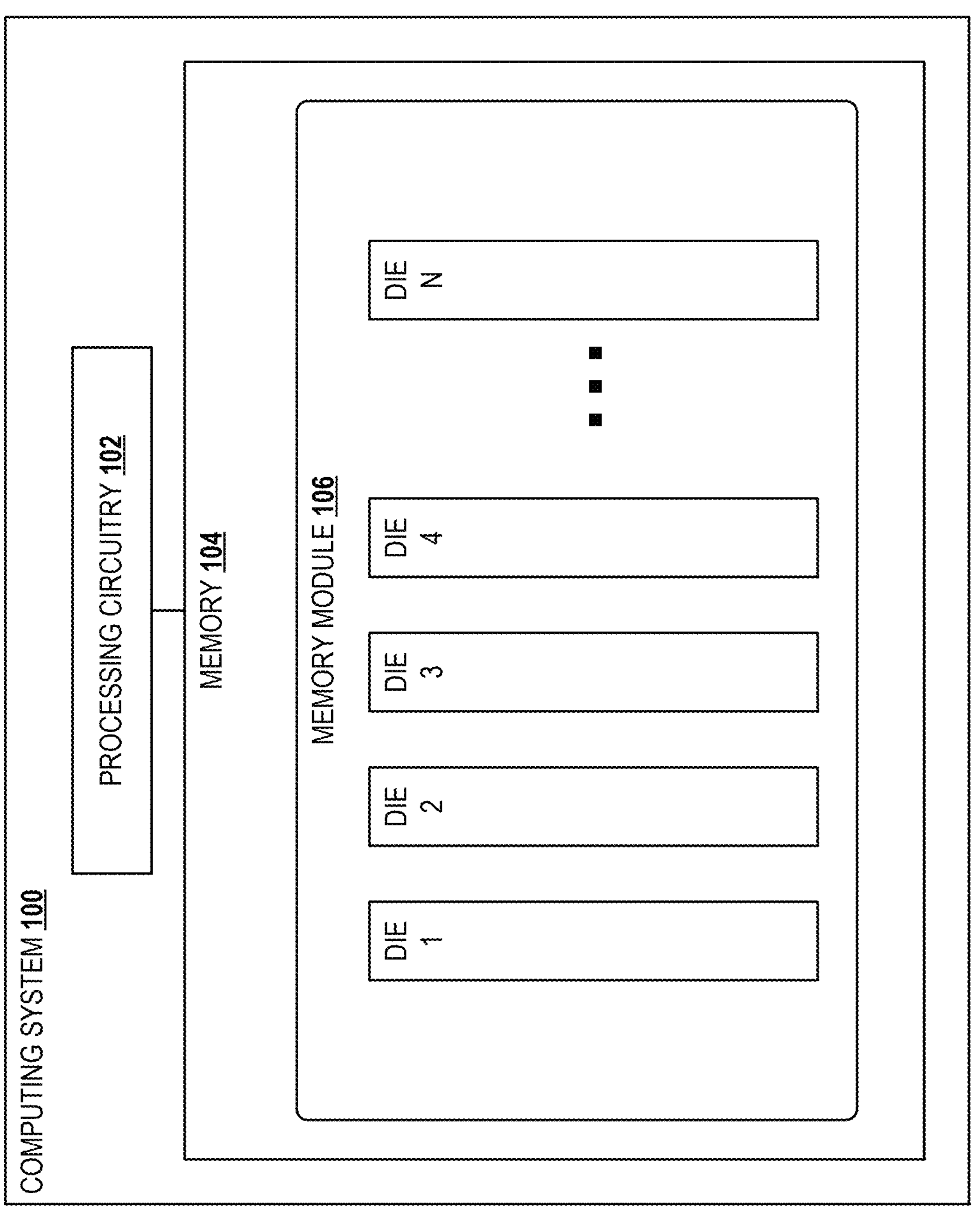
FIG. 1 shows a schematic view of an example computing system for implementing a simplified and efficient error correction code scheme with multiple codewords.

Error correction code (ECC) schemes can be implemented in various ways. One technique includes implementing an on-die ECC scheme, which provides error detection and/or correction on the memory module itself. Additionally or alternatively, an external ECC scheme can be implemented. Different ECC schemes can be implemented depending on the application. For example, in cases where additional metadata is to be stored along with a core block of data, certain ECC schemes can be more reliable. Some such ECC schemes are implemented on a memory module using cyclic redundancy check (CRC) and other techniques, such as performing exclusive-or operations on the die data to encode and store data. For example, some implementations utilize a number of memory dies on the memory module for storing the block of data, a die for storing metadata and a CRC code-word, and a die for storing parity data. In such cases, a single CRC code-word is utilized for error detection of the overall data, including the block of data and the metadata. For example, given a 64-bit memory die configuration and an N number of supported metadata bits, the CRC implemented will be CRC-(64-N). When four bits of metadata is supported, the ECC scheme can use CRC-60 to encode the data (resulting in an undetected error probability of about $2^{-60}=8.7e^{-19}$ for two or more bit errors in CRC code). However, a practical issue with such CRC implementations is that large CRC polynomials and large data block sizes can be inefficient from a computational and power resource point of view.

In view of the observations above, simplified and efficient ECC schemes are provided for encoding and storing data that includes core user data and metadata utilizing multiple shorter CRC codewords. Data from a memory transaction can be split into partitions to be encoded using two or more code-words. Multiple codewords can be implemented in various ways to provide lower computational and power requirements and to simplify hardware implementation. In some implementations, the ECC schemes are implemented on-die. In some implementations, memory dies on a memory module are split into partitions where each partition includes a memory segment from each memory die. Each partition can be encoded separately, resulting in a number of CRC codewords equal to the number of partitions. Similarly, each partition can include a portion of the metadata that is to be stored.

In some implementations, multiple codewords are implemented asymmetrically. For example, the memory die storing the multiple codewords can be partitioned into different memory segments, each memory segment belonging to a different one of the overall partitions. In some implementations, one of these memory segments is designated to store the metadata, resulting in less space for a CRC codeword. In such cases, the remaining memory segments can comparatively hold larger CRC codewords. Additional logical operations can be performed to enhance error detection in memory segments corresponding to the smaller CRC codeword. These and other implementations are described below in further detail with respect to the Figures.

FIG. 1 shows a schematic view of an example computing system 100 for implementing a simplified and efficient error correction code scheme with multiple codewords. The example computing system 100 can include any type of computing devices, including but not limited to personal computers, server computers, tablet computers, mobile computing devices, etc. The example computing system 100 includes processing circuitry 102 and memory 104. Memory 104 can be implemented to include various kinds of memory. In the depicted example, memory 104 includes a memory module 106 that can implement a simplified and efficient ECC scheme using multiple CRC codewords. Various types of memory modules can be utilized. Examples of a memory module include but are not limited to various types of random-access memory, such as a DDR memory module as well as other forms of non-DDR memory.

The memory module 106 can be implemented in various ways. Generally, the memory module 106 includes a variety of components integrated on a printed circuit board to provide different functionalities. In the depicted example, the memory module 106 includes a plurality of N discrete memory dies. The memory module 106 can include any number of memory dies. In some implementations, the memory module 106 includes ten dies. As described herein, a "die" refers to a discrete silicon chip on the memory module 106. For example, a memory die can refer to a discrete chip on the memory module 106 that provides memory storage. A memory die can provide various levels of storage capacity. For example, in some implementations, each of the N dies on the memory module 106 can include sixty-four data storage bits. Any other storage capacity can be implemented as allowed by various factors, such as desired capacity, desired performance, power consumption.

A memory die may contain memory cells, sense amplifiers, and/or other necessary components that enable data storage and retrieval. The memory cells can store binary data, which can be read and written using various circuitry on the memory die. In some implementations, each memory die is organized into multiple banks, which are further divided into rows and columns of memory cells. Generally, a single memory module, such as memory module 106, are fabricated with multiple memory dies to provide higher memory capacity. The number of memory dies in memory module 106 can depend on the application, which can have varying tradeoffs between heat and power economy versus desired capacity and performance characteristics. The memory dies are often connected in parallel and controlled by a memory controller (not shown). Memory controllers can maintain data integrity by managing data flow to and from the memory modules and can implement various error-checking mechanisms. The memory controller can be implemented in various ways. For example, the memory controller can be implemented as a portion of the processing circuitry 102, on the memory module 106, or as an off-module device.

Figure 2:
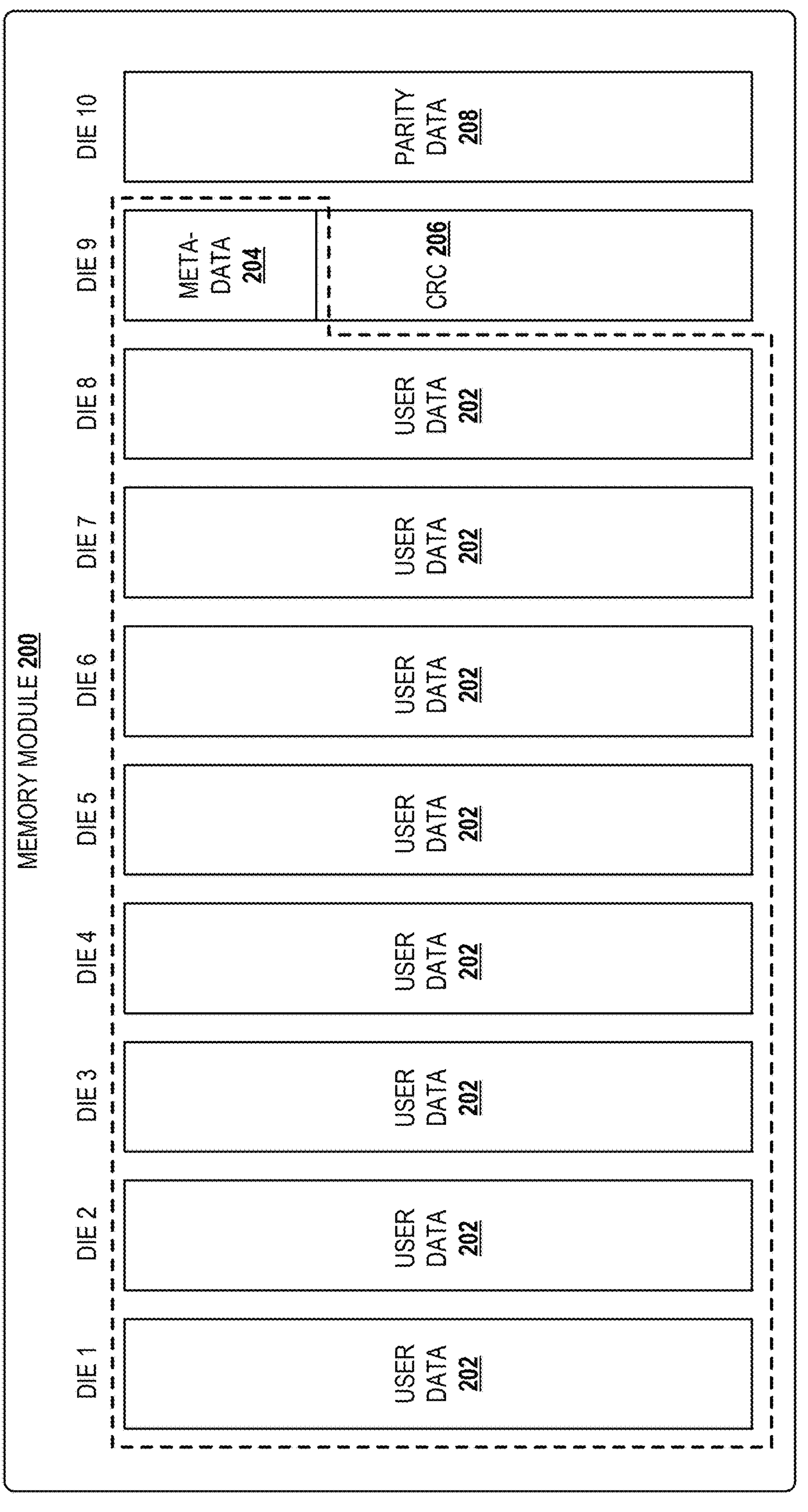
FIG. 2 shows a schematic view of a memory module implementing an error correction code scheme with a single codeword.

FIGS. 2-6 illustrate various ECC schemes and depict a progression of complexity in applying CRC codewords. FIG. 2 shows a schematic view of a memory module 200 implementing an error correction code scheme with a single codeword. The memory module 200 can be implemented in various ways. In the depicted example, the memory module 200 includes ten memory dies. The memory module 200 can include other components (not shown) for enabling data storage and retrieval. Memory modules, such as memory module 106 or 200, can be implemented to store data in various ways. For example, the memory module 200 can store data that includes user data 202 and metadata 204 across some or all of the ten dies. In the depicted example, the user data 202 is stored on eight of the ten dies. In such implementations, the memory module 200 can store up to 512 bits of user data 202, where 64 bits of data is stored on each of the eight dies.

In the depicted example, the 9th memory die is utilized to store the metadata 204 and a CRC 206 codeword. In this CRC implementation, the size of the CRC codeword can depend on the storage capacity of the memory dies and the size of the metadata 204. For example, if the storage capacity of each memory die is 64 bits and the metadata 204 is four bits, then there is 60 bits available for use as CRC. Any memory die capacity, metadata size, and CRC length can be implemented. Different lengths of CRC provide different levels of error detection capabilities. Generally, an n-bit CRC applied to a data block of arbitrary length will detect any single error burst not longer than n bits. For longer error bursts, the probability is approximately $(1-2^{-n})$. As such, CRC-60 provides an undetected error probability of about $(2^{-60}=8.7e^{-19})$ for two or more bit errors.

The ECC scheme implemented on memory module 200 includes use of parity data 208. In the depicted example, the parity data 208 is stored on the $10^{th}$ memory die. Generally, the ECC scheme implemented on memory module 200 starts upon storage of the user data 202 and the metadata 204. User data 202 is stored on the first eight memory dies. The CRC codeword 206 is generated based on the user data 202 and the metadata 204 (depicted as dashed lines). As described above, the length of the CRC codeword 206 can depend on the size of the metadata 204 and the storage capacity of the memory die. The generated CRC codeword 206 is then stored on the ninth memory die along with the metadata. Finally, the parity data 208 is generated and stored on the tenth memory die.

The parity data 208 can be generated in various ways. In some implementations, the parity data 208 is generated by performing an exclusive or (XOR) operation comparing the first nine memory dies (excluding the tenth memory die on which the parity data 208 is to be stored). An XOR operator is a logical operator that returns true ('1') when exactly one of its two inputs is true. For example, the parity data 208 can be generated by performing cascading XOR operations using the contents of the first nine memory dies as the operands (e.g., Die 1 XOR Die 2 XOR Die 3 . . . . XOR Die 9).

Although a large CRC codeword (e.g., a 60-bit long CRC codeword) can provide a low undetected error probability, the computations involved with such an implementation can be undesirable. The techniques provided herein contemplate the use of multiple CRC codewords (which are comparatively shorter than single codewords given the same memory die storage capacity). The use of multiple CRC codewords provides a computational technical advantage and can be implemented in various ways. In some implementations, a memory module is partitioned into two or more partitions, each partition capable of being encoded with a separate CRC codeword.

Figure 3:
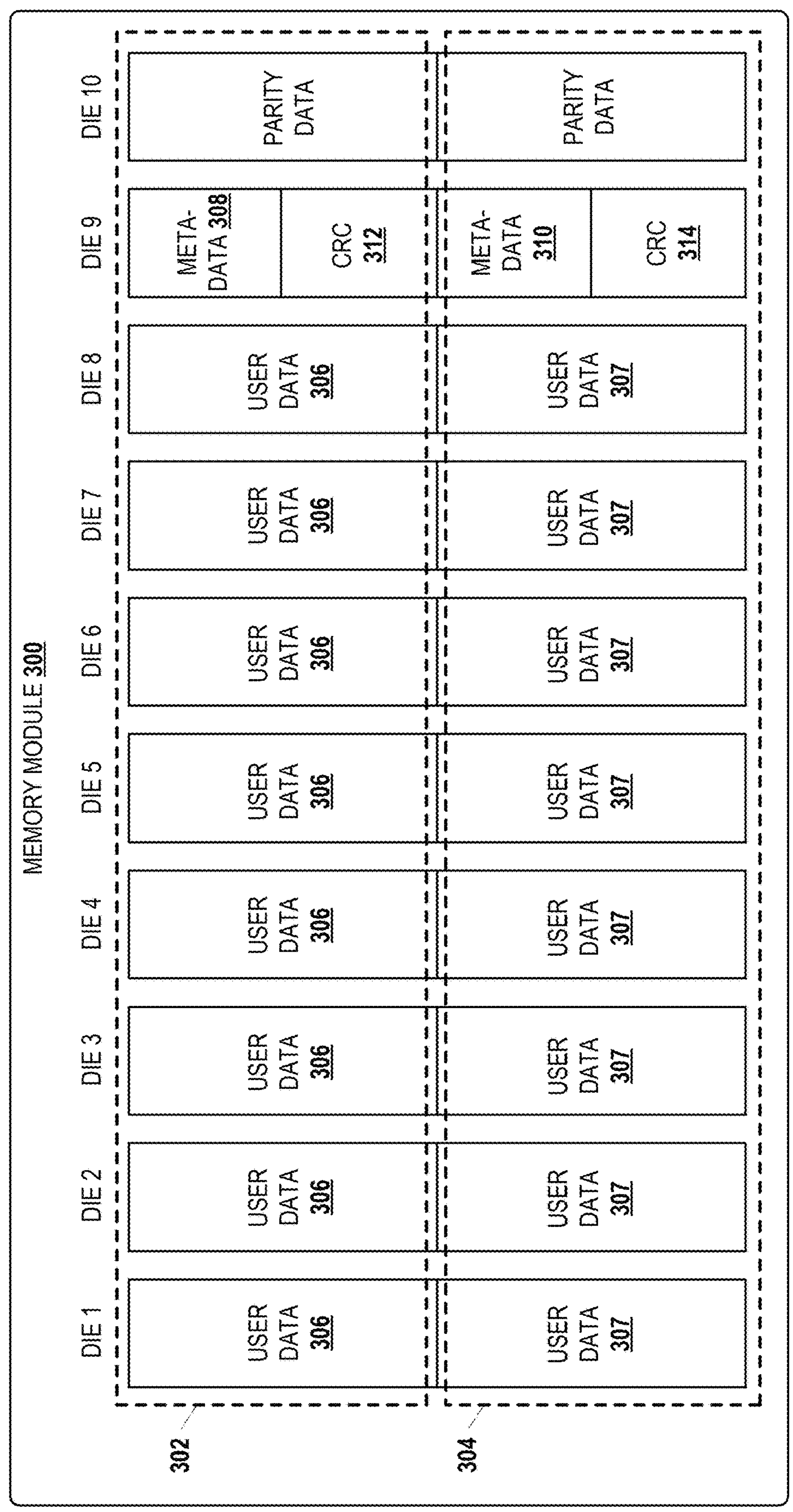
FIG. 3 shows a schematic view of an example memory module implementing a simplified and efficient error correction code scheme with two codewords, which can be implemented in the example computing system of FIG. 1.

FIG. 3 shows a schematic view of an example memory module 300 implementing a simplified and efficient error correction code scheme with two codewords. The example memory module 300 includes ten memory dies that are divided into two partitions 302, 304. Other memory configurations can also be implemented. The partitions 302, 304 are formed such that each partition includes a memory segment from each of the ten dies. A memory segment as used herein refers to a portion of memory on a memory die. In the depicted example, the partitioning resulted in each of the two partitions 302, 304 having half of each of the ten memory dies. Other configurations can be implemented. However, partitioning the memory dies into equal halves enables the highest common CRC length. Rather than dividing the memory dies, partitioning them such that each partition includes a memory segment from each of the memory dies provides several technical advantages, including simpler circuitry and computational complexity.

Similar to the example memory module 200 of FIG. 2, user data 306, 307 is stored on the first eight dies. Metadata is stored on the ninth die, depicted as a first portion 308 of metadata in the first partition and a second portion 310 of metadata in the second partition. For the user data 306 in the first partition 302 and the first portion 308 of metadata, a first CRC codeword 312 is generated and stored in the ninth die. Similarly, for the user data 307 in the second partition 304 and the second portion 310 of metadata, a second CRC codeword 314 is generated and stored in the ninth die. On the tenth die, parity data 316, 318 is generated and stored. As can readily be appreciated, the locations of various portions of data are depicted for illustrative purposes. The data may reside on the memory dies in various configurations. For example, metadata 308, 310 can be stored contiguously rather than separately as depicted in the example memory module 300.

CRC validation for an ECC scheme utilizing multiple codewords requires that all the codewords' CRC=0 (successful validation). For example, in the depicted example of FIG. 3, validation of data on any of the memory dies is successful if validations of the first and second CRC codewords 312, 314 are satisfied. The probability of an undetected error $P_{UE}$ is roughly $1/2^{Combined\_CRC\_Size}$ (or $1/2^{CRC\_Size1} \times 1/2^{CRC\_Size2}$) for complete single-die failures. For multi-die failures, the probability remains roughly $10/2^{Combined\_CRC\_Size}$.

Using multiple codewords simplifies CRC by avoiding a large CRC polynomial and large data block. For example, using CRC-60 with four bits of metadata on a large block of data (entire cache line of >64B) can be computationally undesirable compared to performing CRC-30 twice. However, such schemes involve trade-offs. One trade-off includes changes to the ECC gap patterns, many of which will include bits only in one codeword. These error patterns in some cases may align with more common memory faults. In some implementations, codeword organization can be used in conjunction with fault-bounding to limit the impact of these cases.

Figure 4:
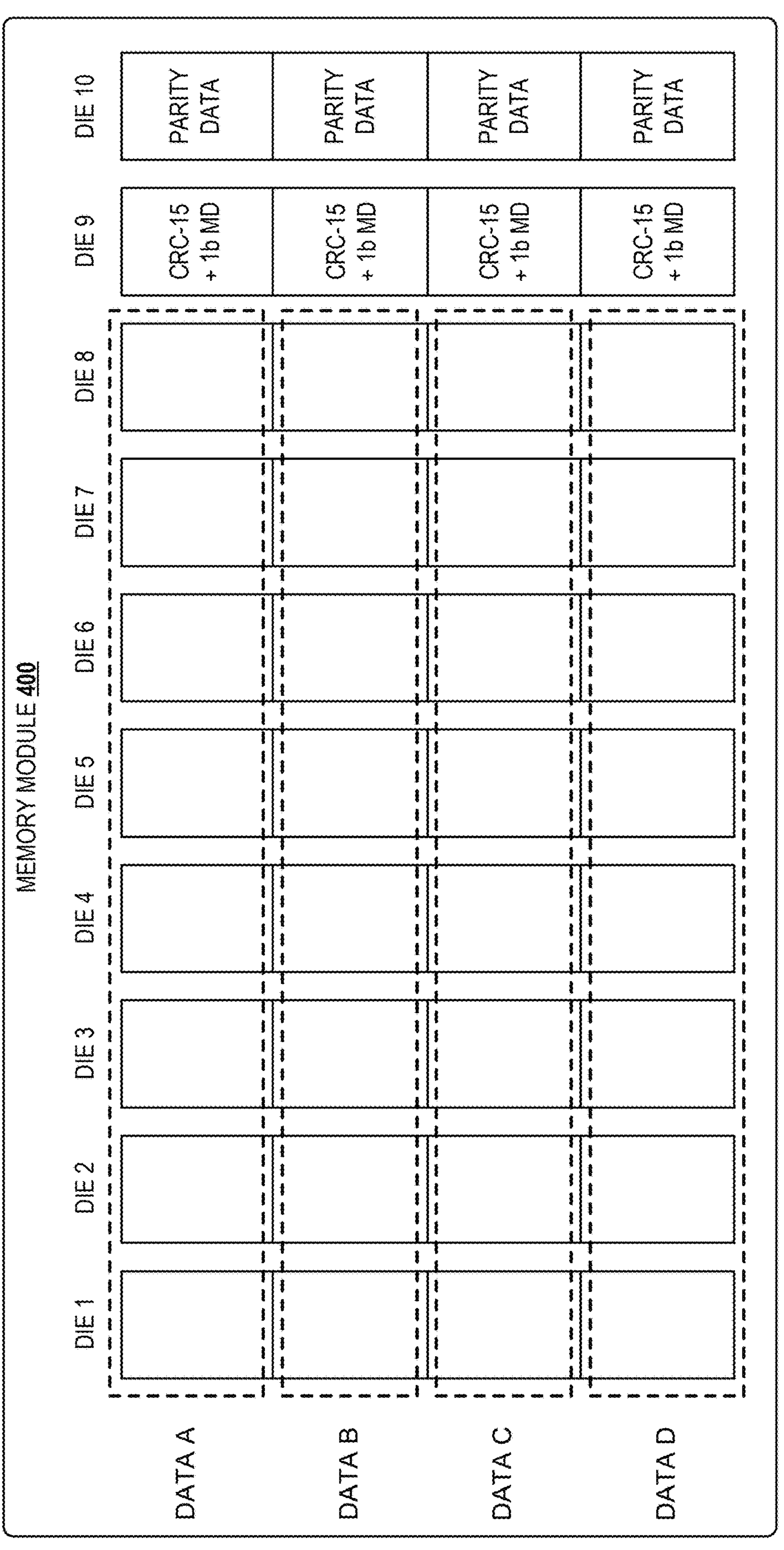
FIG. 4 shows a schematic view of an example memory module implementing a simplified and efficient error correction code scheme with four codewords, which can be implemented in the example computing system of FIG. 1.

In addition to the two-codeword scheme depicted in FIG. 3, ECC utilizing multiple codewords can be implemented using any number of codewords. FIG. 4 shows a schematic view of an example memory module 400 implementing a simplified and efficient error correction code scheme with four codewords. The example memory module 400 includes ten memory dies. Other memory configurations can also be implemented. The example memory module 400 is divided into four partitions such that each partition includes a memory segment from each of the ten dies. In the depicted example, the memory segments are of a similar size.

Similar to the example memory modules 200, 300 of FIGS. 2 and 3, user data is stored on the first eight dies (depicted as "DATA A," "DATA B," "DATA C," and "DATA D" to indicate partitioning of the user data into four portions). Metadata is stored on the ninth die. In the depicted example, the data includes four bits of metadata. Given four partitions, the metadata is divided such that each partition includes one bit of metadata. Given a 64-bit storage capacity of a memory die, each of the partition has fifteen bits leftover for the CRC codeword. As such, the memory module 400 includes the use of four CRC-15 codewords stored on the ninth die. Each of the CRC codewords can be generated based on a respective portion of user data ("DATA A," "DATA B," "DATA C," or "DATA D") and a respective one bit of metadata. Compared to the memory module 200 of FIG. 2, computations involving four CRC-15 can be more efficient compared to one CRC-60. Furthermore, each CRC codeword is applied on a smaller data block size, resulting in further computational efficiency. However, one disadvantage of utilizing four CRC codewords is that if the error on a memory die is only on one codeword, the probability of undetected error will be roughly ($2^{-15}$=3.1$e^{-5}$) instead of the undetected error probability of CRC-60 ($2^{-60}$=8.7$e^{-19}$).

Figure 5:
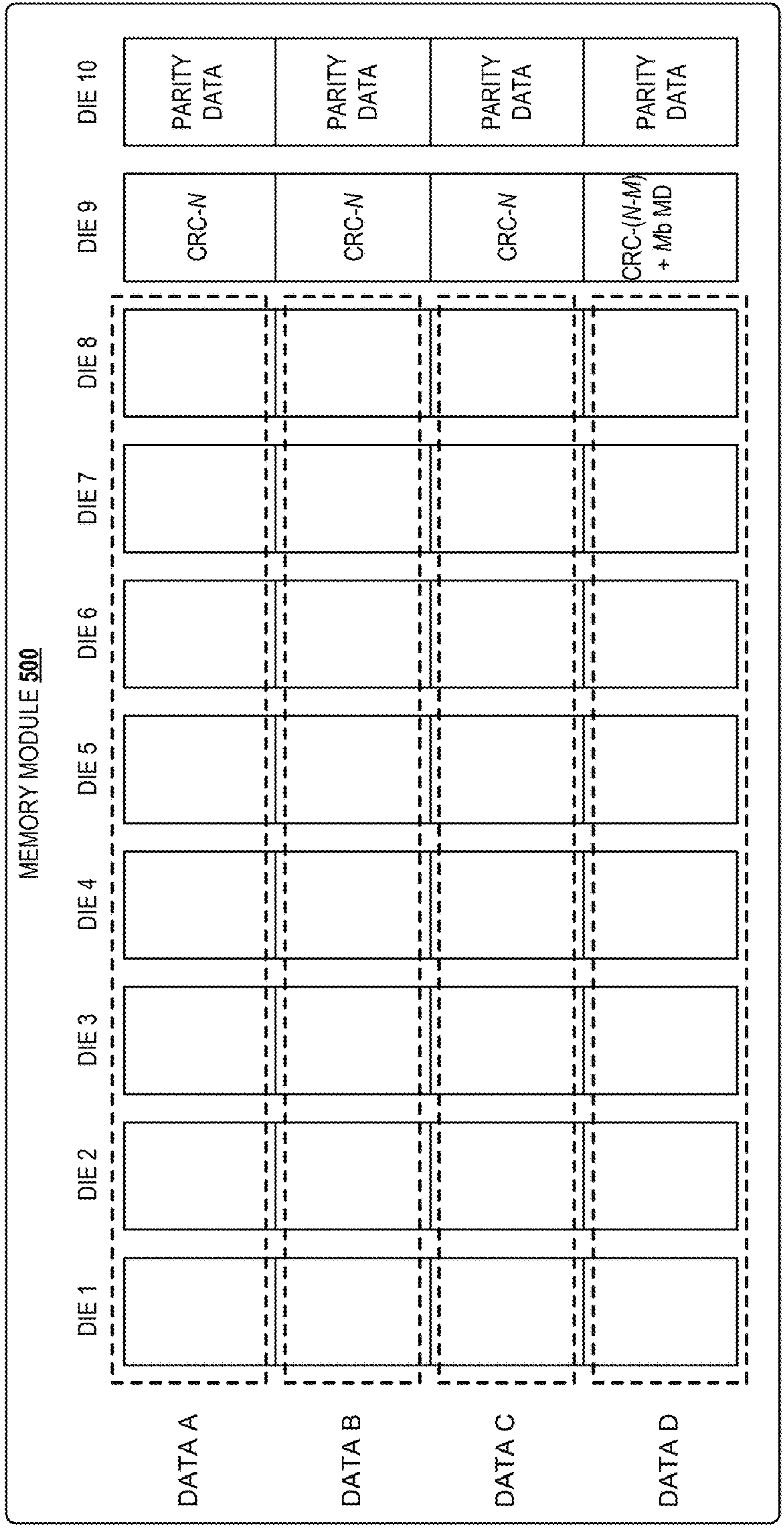
FIG. 5 shows a schematic view of an example memory module implementing an asymmetric error correction code scheme with four codewords, which can be implemented in the example computing system of FIG. 1.

FIG. 5 shows a schematic view of an example memory module 500 implementing an asymmetric error correction code scheme with four codewords. The example memory module 500 includes ten memory dies. In the depicted example, the ECC scheme includes partitioning the ten memory dies into four partitions associated with four respective CRC codewords, at least one of which is of a different length. By utilizing an asymmetric configuration of codewords together with additional procedures, the undetected error probability can be improved. Various asymmetric configurations can be implemented. For example, given the same hardware memory module 400 of FIG. 4 where each memory die includes 64 bits of storage, the example memory module 500 can implement three CRC-16 codewords and one CRC-12 codeword. In the depicted example, each of the three CRC-16 codewords is generated based on a respective portion of user data ("DATA A," "DATA B," or "DATA C"). The CRC-12 codeword is generated based on DATA D and the four bits of metadata. Similar to the example memory module 400 of FIG. 4, parity data can be generated and stored on the tenth die. As can readily be appreciated, different configurations can be implemented depending on several factors, such as memory die storage capacity, metadata size, etc.

The four partitions of the example memory module 500 each includes a sixteen-bit memory segment of the ninth die. In these memory segments, CRC-16 codewords can be stored. For the partition and memory segment containing the CRC-12 codeword, four bits of metadata can also be stored for a total of sixteen bits, equivalent to the other memory segments holding the three CRC-16 codewords. As can readily be appreciated, other configurations can be implemented. Generally, three CRC-N codewords along with a CRC-(N–M) codeword can be implemented, where M bits of metadata can be stored on the same memory segment as the CRC-(N–M) codeword.

Compared to the four CRC-15 codewords utilized in the example memory module 400 of FIG. 4, the CRC-16 codewords can always detect any error up to sixteen burst length. Therefore, they will always detect the errors as the memory dies are partitioned into sixteen-bit memory segments. However, undetected error is still an issue for the CRC-12 codeword. As such, the overall probability of having an undetected error does not theoretically change. Nonetheless, the uncorrectable or missed error probability will be high for errors affecting only the codeword in the case with CRC-12. Improvements can be made to avoid such high probabilities for these cases. In some implementations, the codeword layouts are adjusted to the bit so that more probable errors are on the minimum burst length of the codeword. Another technique involves additional procedures to map more probable memory fault patterns to other patterns that are more likely to be detected by combination of CRC in different codewords.

Figure 6:
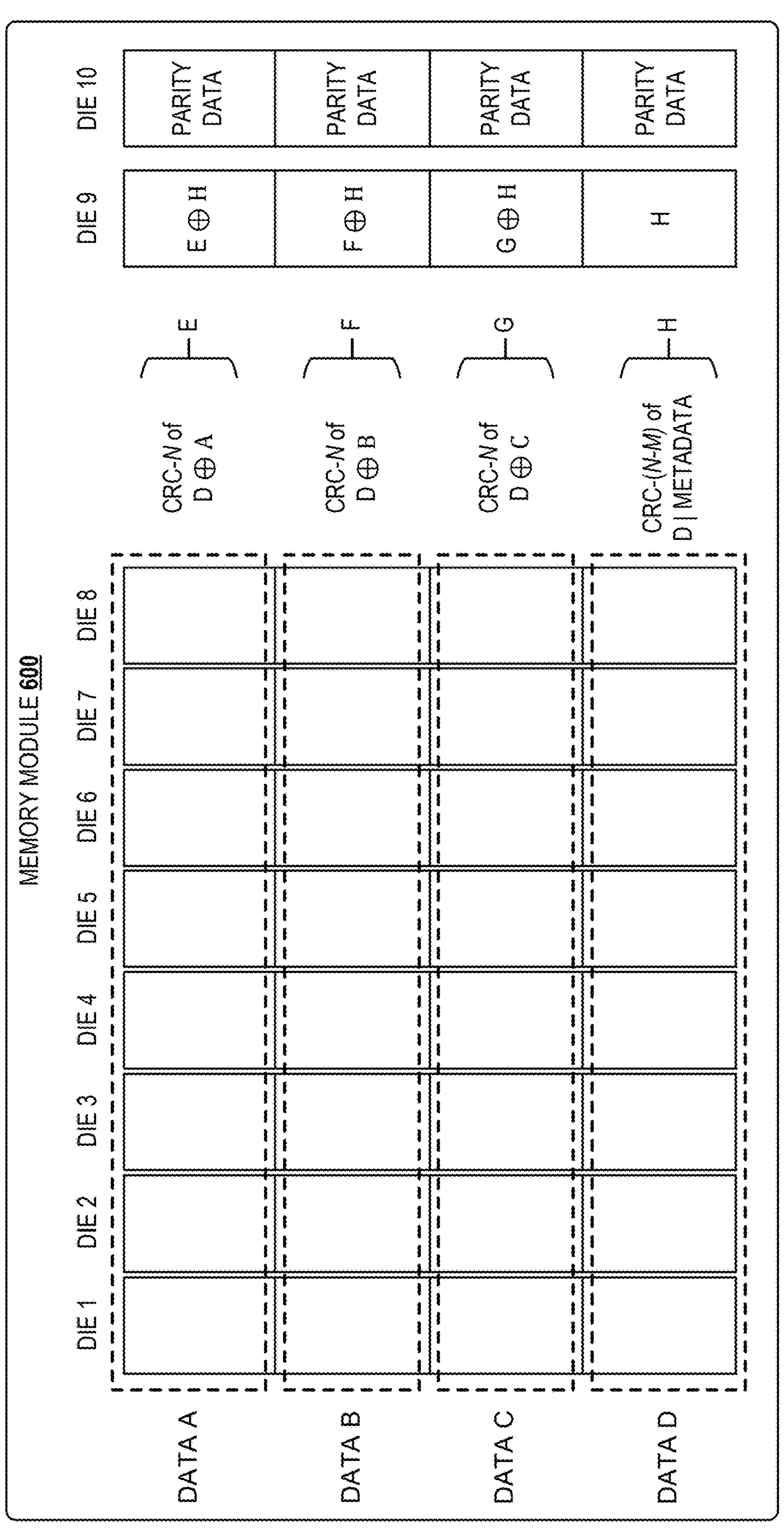
FIG. 6 shows a schematic view of an example memory module implementing a modified asymmetric error correction code scheme with four codewords, which can be implemented in the example computing system of FIG. 1.

FIG. 6 shows a schematic view of an example memory module 600 implementing a modified asymmetric error correction code scheme with four codewords. The example memory module 600 includes ten memory dies divided into four partitions (Partition A, Partition B, Partition C, and Partition D). The modified process starts similarly as other processes, where user data is written to the first eight dies. The user data is partitioned into DATA A, DATA B, DATA C, and DATA D, each respectively associated with Partition A, Partition B, Partition C, and Partition D.

Unlike other processes, the modified process of FIG. 6 generates the CRC codewords based on an XOR result of different sections. Generally, the portion of user data written to the partition with the shorter CRC codeword is XOR'ed with other respective portions of user data. The results can be used to generate the respective CRC codewords. For example, in the example memory module 600, four partitions are defined with one partition associated with the shorter CRC codeword and the metadata (Partition D). This partition (Partition D) is associated with DATA D, which is XOR'ed with other portions of user data to generate some of the CRC codewords. For example, DATA D can be XOR'ed with DATA A, and the result is then used to generate the CRC codeword associated with Partition A. Similarly, DATA Dis XOR'ed with DATA B to generate the CRC codeword associated with Partition B, and DATA D is XOR'ed with DATA C to generate the CRC codeword associated with Partition C. Finally, the shorter CRC codeword associated with Partition D is generated based on DATA D and the metadata.

Instead of writing the CRC codewords and/or metadata directly on the ninth die, the CRC codewords for Partitions A, B, and C (reference 'E,' 'F,' and 'G' in FIG. 6) are XOR'ed with the CRC codeword of Partition D and the metadata (reference 'H' in FIG. 6). The results are written to their respective memory segments in the ninth die. Parity data can then be calculated and written to the tenth die. With this scheme, errors in the 'H' memory segment of the ninth die can be propagated to the codewords, allowing for implementations with the capability to detect all error patterns with higher chances to be detected.

For ease of discussion, the modified process of FIG. 6 will now be discussed with respect to an implementation with ten 64-bit memory dies divided into four partitions respectively using three CRC-16 codewords and one CRC-12 codeword. CRC-16 detects any error pattern with burst length of less than or equal to 16 bits. Therefore, CRC-16 can detect all error patterns on the memory module of FIG. 6 when they are in codewords with CRC-16, except if the error patterns on A, B, C, and D blocks (DATA A, DATA B, DATA C, and DATA D) are the same. If the error pattern is the same on all four blocks, then the error pattern on DRA, DOB, and DOC are all zero. The probability of such an event is approximately:

$$\begin{aligned} P_1(\text{error pattern on } D\oplus A,\ D\oplus B, \text{ and } D\oplus C \text{ are all zero}) &= (\text{any pattern in } D)\times P(C=D)\times P(B=D)\times P(A=D) \\ &= 1\times 2^{-16}\times 2^{-16}\times 2^{-16} = 2^{-48} \end{aligned}$$

In such an event where DOA, DOB, and DOC are zero and the corresponding CRC cannot detect them, the error pattern on [D|Metadata] is not zero as we have all equal non-zero patterns in A, B, C, and D. Therefore, CRC-12 can detect them with $P_2$ ($2^{-16}$). As such, $P_{UE}=P_1\cdot P_2=2^{-60}=8.7e^{-19}$. The errors in undetected error (UE) patterns resulted in this modified process are distributed all over the chip and are not among the more likely error patterns that practically happen in the memory.

FIG. 7 shows a flow diagram of an example method 700 for implementing a simplified and efficient error correction code scheme with multiple codewords. At step 702, the example method 700 includes partitioning a memory module into a plurality of partitions. The memory module can be partitioned into any number of partitions. In some implementations, the memory module is partitioned into four partitions. The memory module includes a plurality of dies, which can be logically partitioned such that each partition includes a memory segment from each of the plurality of dies. In some implementations, the memory segments are of equal sizes. Memory modules with any number of memory dies can be utilized. In some implementations, the memory module includes ten memory dies.

At step 704, the example method 700 includes storing a portion of user data on one or more memory segments of a respective partition. In some implementations, the one or more memory segments of the respective partition include memory segments from all but two memory dies of the plurality of dies. In further implementations, the plurality of dies includes ten dies, and the one or more memory segments include memory segments from eight of the ten dies.

At step 706, the example method 700 includes storing a CRC codeword on a memory segment different from the one or more memory segments of the respective partition storing the portion of the user data. In some implementations, metadata, or a portion of the metadata, is stored the same memory segment as the CRC codeword. The CRC codeword can be generated in various ways. In some implementations, the CRC codeword is generated based on the portion of the user data stored on the one or more memory segments of the partition and/or the metadata (or the portion of the metadata).

Steps 704 and 706 can be repeated for each partition identified in step 702. Depending on the application, variations of the steps can be applied. For example, the example method 700 described herein can be utilized to implemented either symmetric or asymmetric partitions of CRC codewords. In cases where a symmetric implementation is performed, the core user data and metadata are evenly split among the partitions. Steps 704 and 706 can be repeated for each partition independently. In asymmetric versions, one partition may store all the metadata while the remaining partitions contain longer CRC codewords. In some implementations, the CRC codewords and/or metadata portions can be stored on the same memory die.

At step 708, the example method 700 includes storing parity data on one of the plurality of dies. Parity data can be generated in various ways. In some implementations, the parity data is generated by performing an XOR operation comparing the plurality of dies excluding the die on which the parity data is to be store. For example, in an implementation where the memory module has an N number of memory dies, the parity data can be generated by performing an XOR operation on memory dies 1-(N−1), using the contents of memory dies 1-(N−1) as the operands in a cascading XOR operation. The results can be stored on memory die N as the parity data.

FIG. 7 illustrates an example method 700 for implementing a simplified ECC scheme with multiple codewords. The method 700 involves partitioning a memory module into multiple partitions and encoding each partition separately with individual codewords. However, compared to single codeword implementations, undetected error detection rates of such ECC schemes using multiple codewords can be higher due to shorter CRC codeword lengths. To address this issue, a modified simplified and efficient asymmetric ECC scheme can be implemented to operate on XOR results of various combinations of the data to be encoded and stored. This can introduce a small amount of computational requirement while greatly lowering the undetected error detection rate.

FIG. 8 shows a flow diagram of an example method for implementing a modified asymmetric error correction code scheme with multiple codewords. At step 802, the example method 800 includes partitioning a memory module into a plurality of partitions. The memory module can be partitioned into any number of partitions. In some implementations, the memory module is partitioned into four partitions. The memory module can include a plurality of dies that is partitioned such that each partition includes a memory segment from each of the plurality of dies. In some implementations, the memory segments are of equal sizes. Memory modules with any number of memory dies can be utilized. In some implementations, the memory module includes ten memory dies.

At step 804, the example method 800 includes, on a first partition of the plurality of partitions, storing a first portion of user data on one or more memory segments of the first partition. In some implementations, the one or more memory segments of the first partition include memory segments from all but two memory dies of the plurality of dies. In further implementations, the plurality of dies includes ten dies, and the one or more memory segments include memory segments from eight of the ten dies.

At step 806, the example method 800 includes, on the first partition of the plurality of partitions, storing a first CRC codeword and metadata on a memory segment different from the one or more memory segments of the first partition storing the first portion of the user data. The first CRC codeword can be generated in various ways. In some implementations, the first CRC codeword is generated based on the first portion of the user data and the metadata.

At step 808, the example method 800 includes storing a second portion of the user data on one or more memory segments of the second partition. Similar to the storing of the first portion of the user data in step 804, the one or more memory segments of the second partition can include memory segments from all but two memory dies of the plurality of dies. For example, the plurality of dies can include ten dies, and the one or more memory segments can include memory segments from eight of the ten dies.

At step 810, the example method 800 includes calculating a second CRC codeword based on the first portion and the second portion of the user data. The second CRC codeword can be calculated in various ways. For example, the second CRC codeword can be calculated based on an XOR result comparing the first portion of the user data against the second portion of the user data. In some implementations, the second CRC codeword is longer than the first CRC codeword. In further implementations, the second CRC codeword has a length equal to the combined length of the first CRC codeword and the metadata.

At step 812, the example method 800 includes storing, on a memory segment different from the one or more memory segments of the second partition, an XOR result comparing the second CRC codeword against the first CRC codeword and the metadata. In some implementations, the XOR result described above, the first CRC codeword, and the metadata are stored on a same die of the plurality of dies.

Steps 808-812 can be repeated on each of the remaining partitions. For example, Steps 808-812 can be performed on a third partition of the plurality of partitions. The process can include storing a third portion of the user data on one or more memory segments of the third partition. The process can further include calculating a third CRC codeword based on the first portion and the third portion of the user data. The third CRC codeword can be calculated in various ways, including those described above with respect to the second CRC codeword. For example, the third CRC codeword can be calculated based on an XOR result comparing the first portion of the user data against the third portion of the user data. In some implementations, the third CRC codeword is longer than the first CRC codeword. In some implementations, the third CRC codeword has the same bit length as the second CRC codeword. The process can further include storing, on a memory segment different from the one or more memory segments of the third partition, an XOR result comparing the third CRC codeword against the first CRC codeword and the metadata.

At step 814, the example method 800 includes storing parity data on one of the plurality of dies. Parity data can be generated in various ways. In some implementations, the parity data is generated by performing an XOR operation comparing the plurality of dies excluding the die on which the parity data is to be store. For example, in an implementation where the memory module has an N number of memory dies, the parity data can be generated by performing an XOR operation on memory dies 1-(N−1), using the contents of memory dies 1-(N−1) as the operands in a cascading XOR operation. The results can be stored on memory die N as the parity data.

Simplified and efficient ECC schemes are provided for encoding and storing data that includes core user data and metadata utilizing multiple CRC codewords. Multiple CRC codewords can be implemented by partitioning the memory dies on a memory module into multiple partitions, each partition associated with a separate CRC codeword. With a smaller CRC codeword, error detection rates may suffer. To address this issue, an asymmetric scheme, together with additional procedures, can be implemented on exclusive-or results of different portions of the data to provide enhanced error detection.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
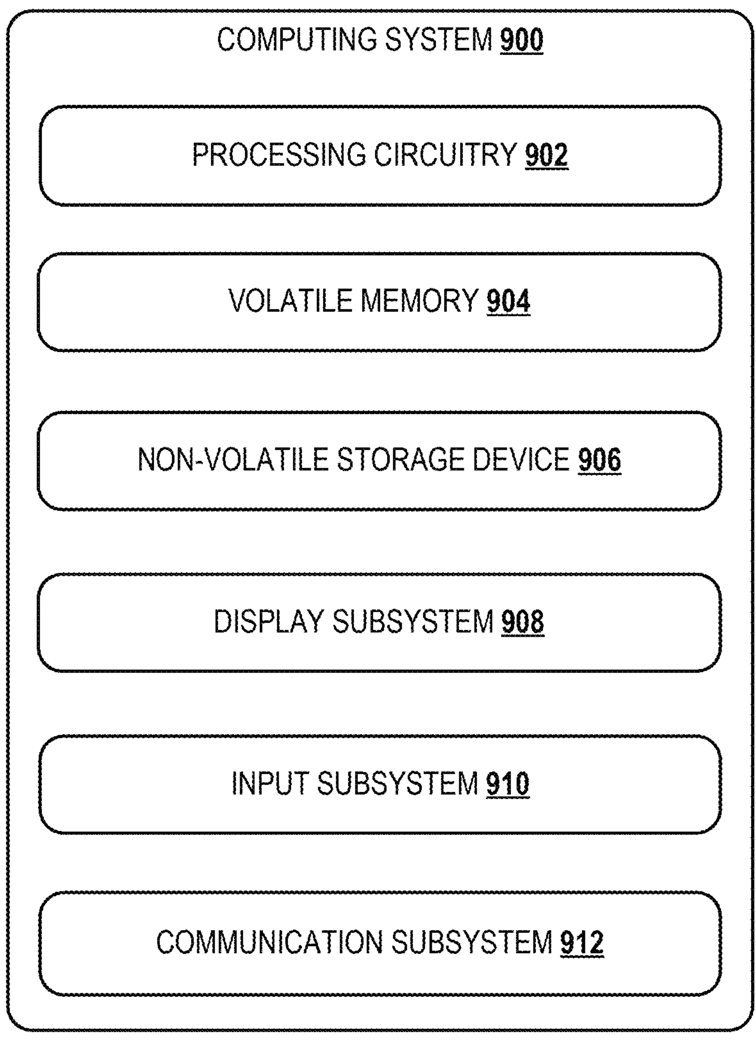
FIG. 9 shows a schematic view of an example computing environment in which the computer system of FIG. 1 may be enacted.

FIG. 9 schematically shows a non-limiting embodiment of a computing system 900 that can enact one or more of the methods and processes described above. Computing system 900 is shown in simplified form. Computing system 900 may embody the computing system 100 described above and illustrated in FIG. 1. Components of computing system 900 may be included in one or more personal computers, server computers, tablet computers, home-entertainment computers, network computing devices, video game devices, mobile computing devices, mobile communication devices (e.g., smart phone), and/or other computing devices, and wearable computing devices such as smart wristwatches and head mounted augmented reality devices.

Computing system 900 includes processing circuitry 902, volatile memory 904, and a non-volatile storage device 906. Computing system 900 may optionally include a display subsystem 908, input subsystem 910, communication subsystem 912, and/or other components not shown in FIG. 9.

Processing circuitry 902 includes a logic processor that can be implemented with one or more physical devices configured to execute instructions. For example, the processing circuitry 902 may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The processing circuitry 902 may include one or more physical processors configured to execute software instructions. Additionally or alternatively, the processing circuitry 902 may include one or more hardware logic circuits or firmware devices configured to execute hardware-implemented logic or firmware instructions. Processors of the processing circuitry 902 may be single-core or multi-core, and the instructions executed thereon may be configured for sequential, parallel, and/or distributed processing. Individual components of the processing circuitry 902 optionally may be distributed among two or more separate devices, which may be remotely located and/or configured for coordinated processing. Aspects of the processing circuitry 902 may be virtualized and executed by remotely accessible, networked computing devices configured in a cloud-computing configuration. In such a case, these virtualized aspects are run on different physical logic processors of various different machines, it will be understood.

Non-volatile storage device 906 includes one or more physical devices configured to hold instructions executable by the processing circuitry 902 to implement the methods and processes described herein. When such methods and processes are implemented, the state of non-volatile storage device 906 may be transformed—e.g., to hold different data.

Non-volatile storage device 906 may include physical devices that are removable and/or built in. Non-volatile storage device 906 may include optical memory, semiconductor memory, and/or magnetic memory, or other mass storage device technology. Non-volatile storage device 906 may include nonvolatile, dynamic, static, read/write, read-only, sequential-access, location-addressable, file-addressable, and/or content-addressable devices. It will be appreciated that non-volatile storage device 906 is configured to hold instructions even when power is cut to the non-volatile storage device 906.

Volatile memory 904 may include physical devices that include random access memory. Volatile memory 904 is typically utilized by processing circuitry 902 to temporarily store information during processing of software instructions. It will be appreciated that volatile memory 904 typically does not continue to store instructions when power is cut to the volatile memory 904.

Aspects of processing circuitry 902, volatile memory 904, and non-volatile storage device 906 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 typically implemented in software by a processor to perform a particular function using portions of volatile memory, which function involves transformative processing that specially configures the processor to perform the function. Thus, a module, program, or engine may be instantiated via processing circuitry 902 executing instructions held by non-volatile storage device 906, using portions of volatile memory 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 908 may be used to present a visual representation of data held by non-volatile storage device 906. The visual representation may take the form of a graphical user interface (GUI). As the herein described methods and processes change the data held by the non-volatile storage device, and thus transform the state of the non-volatile storage device, the state of display subsystem 908 may likewise be transformed to visually represent changes in the underlying data. Display subsystem 908 may include one or more display devices utilizing virtually any type of technology. Such display devices may be combined with processing circuitry 902, volatile memory 904, and/or non-volatile storage device 906 in a shared enclosure, or such display devices may be peripheral display devices.

When included, input subsystem 910 may comprise or interface with one or more user-input devices such as a keyboard, mouse, touch screen, camera, or microphone.

When included, communication subsystem 912 may be configured to communicatively couple various computing devices described herein with each other, and with other devices. Communication subsystem 912 may include wired and/or wireless communication devices compatible with one or more different communication protocols. As non-limiting examples, the communication subsystem may be configured for communication via a wired or wireless local- or wide-area network, broadband cellular network, etc. In some embodiments, the communication subsystem may allow computing system 900 to send and/or receive messages to and/or from other devices via a network such as the Internet.

Another example provides a computing system for implementing an asymmetric error correction code scheme with multiple codewords, the computing system comprising: processing circuitry and memory storing instructions that, during execution, causes the processing circuitry to: encode data comprising user data and metadata in a memory module comprising a plurality of dies by: logically partitioning the memory module into a plurality of partitions, wherein each partition comprises a plurality of memory segments that includes a memory segment from each of the plurality of dies; on a first partition of the plurality of partitions: storing a first portion of the user data on one or more memory segments of the first partition; and storing a first cyclic redundancy check (CRC) codeword and the metadata on a memory segment of the first partition different from the one or more memory segments of the first partition, wherein the first CRC codeword is generated based on the first portion of the user data and the metadata; and storing parity data on one of the plurality of dies. In this example, additionally or alternatively, encoding the data further comprises: on a second partition of the plurality of partitions: storing a second portion of the user data on one or more memory segments of the second partition; calculating a second CRC codeword based on the first portion of the user data and the second portion of the user data, wherein the second CRC codeword is longer than the first CRC codeword; and storing, on a memory segment of the second partition different from the one or more memory segments of the second partition, an exclusive-or (XOR) result comparing the second CRC codeword against the first CRC codeword and the metadata. In this example, additionally or alternatively, encoding the data further comprises: on a third partition of the plurality of partitions: storing a third portion of the user data on one or more memory segments of the third partition; calculating a third CRC codeword based on the first portion of the user data and the third portion of the user data, wherein the third CRC codeword is longer than the first CRC codeword; and storing, on a memory segment of the third partition different from the one or more memory segments of the third partition, an XOR result comparing the third CRC codeword against the first CRC codeword and the metadata. In this example, additionally or alternatively, the second CRC codeword is calculated based on an XOR result comparing the first portion of the user data against the second portion of the user data. In this example, additionally or alternatively, the first CRC codeword, the metadata, and the XOR result comparing the second CRC codeword against the first CRC codeword and the metadata are stored on a same die of the plurality of dies. In this example, additionally or alternatively, a length of the second CRC codeword is equal to a combined length of the first CRC codeword and the metadata. In this example, additionally or alternatively, the plurality of dies comprises ten dies, and wherein the user data is stored on eight of the ten dies. In this example, additionally or alternatively, the plurality of partitions comprises at least four partitions. In this example, additionally or alternatively, the parity data is generated by performing an XOR operation comparing the plurality of dies excluding the die on which the parity data is to be stored.

Another example provides a method for implementing an asymmetric error correction code scheme with multiple codewords, the method comprising: encoding data comprising user data and metadata in a memory module comprising a plurality of dies by: logically partitioning the memory module into a plurality of partitions, wherein each partition comprises a plurality of memory segments that includes a memory segment from each of the plurality of dies; on a first partition of the plurality of partitions: storing a first portion of the user data on one or more memory segments of the first partition; and storing a first cyclic redundancy check (CRC) codeword and the metadata on a memory segment of the first partition different from the one or more memory segments of the first partition, wherein the first CRC codeword is generated based on the first portion of the user data and the metadata; and storing parity data on one of the plurality of dies. In this example, additionally or alternatively, encoding the data further comprises: on a second partition of the plurality of partitions: storing a second portion of the user data on one or more memory segments of the second partition; calculating a second CRC codeword based on the first portion of the user data and the second portion of the user data, wherein the second CRC codeword is longer than the first CRC codeword; and storing, on a memory segment of the second partition different from the one or more memory segments of the second partition, an exclusive-or (XOR) result comparing the second CRC codeword against the first CRC codeword and the metadata. In this example, additionally or alternatively, encoding the data further comprises: on a third partition of the plurality of partitions: storing a third portion of the user data on one or more memory segments of the third partition; calculating a third CRC codeword based on the first portion of the user data and the third portion of the user data, wherein the third CRC codeword is longer than the first CRC codeword; and storing, on a memory segment of the third partition different from the one or more memory segments of the third partition, an XOR result comparing the third CRC codeword against the first CRC codeword and the metadata. In this example, additionally or alternatively, the second CRC codeword is calculated based on an XOR result comparing the first portion of the user data against the second portion of the user data. In this example, additionally or alternatively, the first CRC codeword, the metadata, and the XOR result comparing the second CRC codeword against the first CRC codeword and the metadata are stored on a same die of the plurality of dies. In this example, additionally or alternatively, a length of the second CRC codeword is equal to a combined length of the first CRC codeword and the metadata. In this example, additionally or alternatively, the plurality of dies comprises ten dies, and wherein the user data is stored on eight of the ten dies. In this example, additionally or alternatively, the plurality of partitions comprises at least four partitions. In this example, additionally or alternatively, the parity data is generated by performing an XOR operation comparing the plurality of dies excluding the die on which the parity data is to be stored.

Another example provides a method for implementing an error correction code scheme with multiple codewords, the method comprising: encoding data comprising user data in a memory module comprising a plurality of dies by: logically partitioning the memory module into a plurality of partitions, wherein each partition comprises a plurality of memory segments that includes a memory segment from each of the plurality of dies; for each of the plurality of partitions: storing a portion of the user data on one or more memory segments of the partition; and storing a cyclic redundancy check (CRC) codeword on a memory segment of the partition different from the one or more memory segments of the partition, wherein the CRC codeword is generated based on the portion of the user data; and storing parity data on one of the plurality of dies. In this example, additionally or alternatively, the data further comprises metadata, and wherein each of the CRC codewords is stored together with a respective portion of the metadata on a respective memory segment, and wherein each of the CRC codewords is generated further based on the respective portion of the metadata.

"And/or" as used herein is defined as the inclusive-or V, as specified by the following truth table:

| A | B | A ∨ B |
|---|---|---|
| True | True | True |
| True | False | True |
| False | True | True |
| False | False | False |

"XOR" as used herein is defined as the exclusive-or V or ⊕, as specified by the following truth table:

| A | B | A ⊻ B |
|---|---|---|
| True | True | False |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system for implementing an asymmetric error correction code scheme with multiple codewords, the computing system comprising:
- processing circuitry and memory storing instructions that, during execution, causes the processing circuitry to:
  - encode data comprising user data and metadata in a memory module comprising a plurality of dies by:
    - logically partitioning the memory module into a plurality of partitions, wherein each partition comprises a plurality of memory segments that includes a memory segment from each of the plurality of dies;
    - on a first partition of the plurality of partitions:
      - storing a first portion of the user data on one or more memory segments of the first partition; and
      - storing a first cyclic redundancy check (CRC) codeword and the metadata on a memory segment of the first partition different from the one or more memory segments of the first partition, wherein the first CRC codeword is generated based on the first portion of the user data and the metadata; and
  - storing parity data on one of the plurality of dies.

2. The computing system of claim 1, wherein encoding the data further comprises:
- on a second partition of the plurality of partitions:
  - storing a second portion of the user data on one or more memory segments of the second partition;
  - calculating a second CRC codeword based on the first portion of the user data and the second portion of the user data, wherein the second CRC codeword is longer than the first CRC codeword; and
  - storing, on a memory segment of the second partition different from the one or more memory segments of the second partition, an exclusive-or (XOR) result comparing the second CRC codeword against the first CRC codeword and the metadata.

3. The computing system of claim 2, wherein encoding the data further comprises:
- on a third partition of the plurality of partitions:
  - storing a third portion of the user data on one or more memory segments of the third partition;
  - calculating a third CRC codeword based on the first portion of the user data and the third portion of the user data, wherein the third CRC codeword is longer than the first CRC codeword; and
  - storing, on a memory segment of the third partition different from the one or more memory segments of the third partition, an XOR result comparing the third CRC codeword against the first CRC codeword and the metadata.

4. The computing system of claim 2, wherein the second CRC codeword is calculated based on an XOR result comparing the first portion of the user data against the second portion of the user data.

5. The computing system of claim 2, wherein the first CRC codeword, the metadata, and the XOR result comparing the second CRC codeword against the first CRC codeword and the metadata are stored on a same die of the plurality of dies.

6. The computing system of claim 2, wherein a length of the second CRC codeword is equal to a combined length of the first CRC codeword and the metadata.

7. The computing system of claim 1, wherein the plurality of dies comprises ten dies, and wherein the user data is stored on eight of the ten dies.

8. The computing system of claim 1, wherein the plurality of partitions comprises at least four partitions.

9. The computing system of claim 1, wherein the parity data is generated by performing an XOR operation comparing the plurality of dies excluding a die on which the parity data is to be stored.

10. Enacted on a computing system, a method for implementing an asymmetric error correction code scheme with multiple codewords, the method comprising:
- encoding data comprising user data and metadata in a memory module comprising a plurality of dies by:
  - logically partitioning the memory module into a plurality of partitions, wherein each partition comprises a plurality of memory segments that includes a memory segment from each of the plurality of dies;
  - on a first partition of the plurality of partitions:
    - storing a first portion of the user data on one or more memory segments of the first partition; and
    - storing a first cyclic redundancy check (CRC) codeword and the metadata on a memory segment of the first partition different from the one or more memory segments of the first partition, wherein the first CRC codeword is generated based on the first portion of the user data and the metadata; and storing parity data on one of the plurality of dies.

11. The method of claim 10, wherein encoding the data further comprises:

on a second partition of the plurality of partitions:

storing a second portion of the user data on one or more memory segments of the second partition;

calculating a second CRC codeword based on the first portion of the user data and the second portion of the user data, wherein the second CRC codeword is longer than the first CRC codeword; and storing, on a memory segment of the second partition different from the one or more memory segments of the second partition, an exclusive-or (XOR) result comparing the second CRC codeword against the first CRC codeword and the metadata.

12. The method of claim 11, wherein encoding the data further comprises:

on a third partition of the plurality of partitions:

storing a third portion of the user data on one or more memory segments of the third partition;

calculating a third CRC codeword based on the first portion of the user data and the third portion of the user data, wherein the third CRC codeword is longer than the first CRC codeword; and storing, on a memory segment of the third partition different from the one or more memory segments of the third partition, an XOR result comparing the third CRC codeword against the first CRC codeword and the metadata.

13. The method of claim 11, wherein the second CRC codeword is calculated based on an XOR result comparing the first portion of the user data against the second portion of the user data.

14. The method of claim 11, wherein the first CRC codeword, the metadata, and the XOR result comparing the second CRC codeword against the first CRC codeword and the metadata are stored on a same die of the plurality of dies.

15. The method of claim 11, wherein a length of the second CRC codeword is equal to a combined length of the first CRC codeword and the metadata.

16. The method of claim 10, wherein the plurality of dies comprises ten dies, and wherein the user data is stored on eight of the ten dies.

17. The method of claim 10, wherein the plurality of partitions comprises at least four partitions.

18. The method of claim 10, wherein the parity data is generated by performing an XOR operation comparing the plurality of dies excluding a die on which the parity data is to be stored.

19. Enacted on a computing system, a method for implementing an error correction code scheme with multiple codewords, the method comprising:

encoding data comprising user data in a memory module comprising a plurality of dies by:

logically partitioning the memory module into a plurality of partitions, wherein each partition comprises a plurality of memory segments that includes a memory segment from each of the plurality of dies;

for each of the plurality of partitions:

storing a portion of the user data on one or more memory segments of the partition; and storing a cyclic redundancy check (CRC) codeword on a memory segment of the partition different from the one or more memory segments of the partition, wherein the CRC codeword is generated based on the portion of the user data; and storing parity data on one of the plurality of dies.

20. The method of claim 19, wherein the data further comprises metadata, and wherein each of the CRC codewords is stored together with a respective portion of the metadata on a respective memory segment, and wherein each of the CRC codewords is generated further based on the respective portion of the metadata.

* * * * *